UNITED STATES PATENT OFFICE.

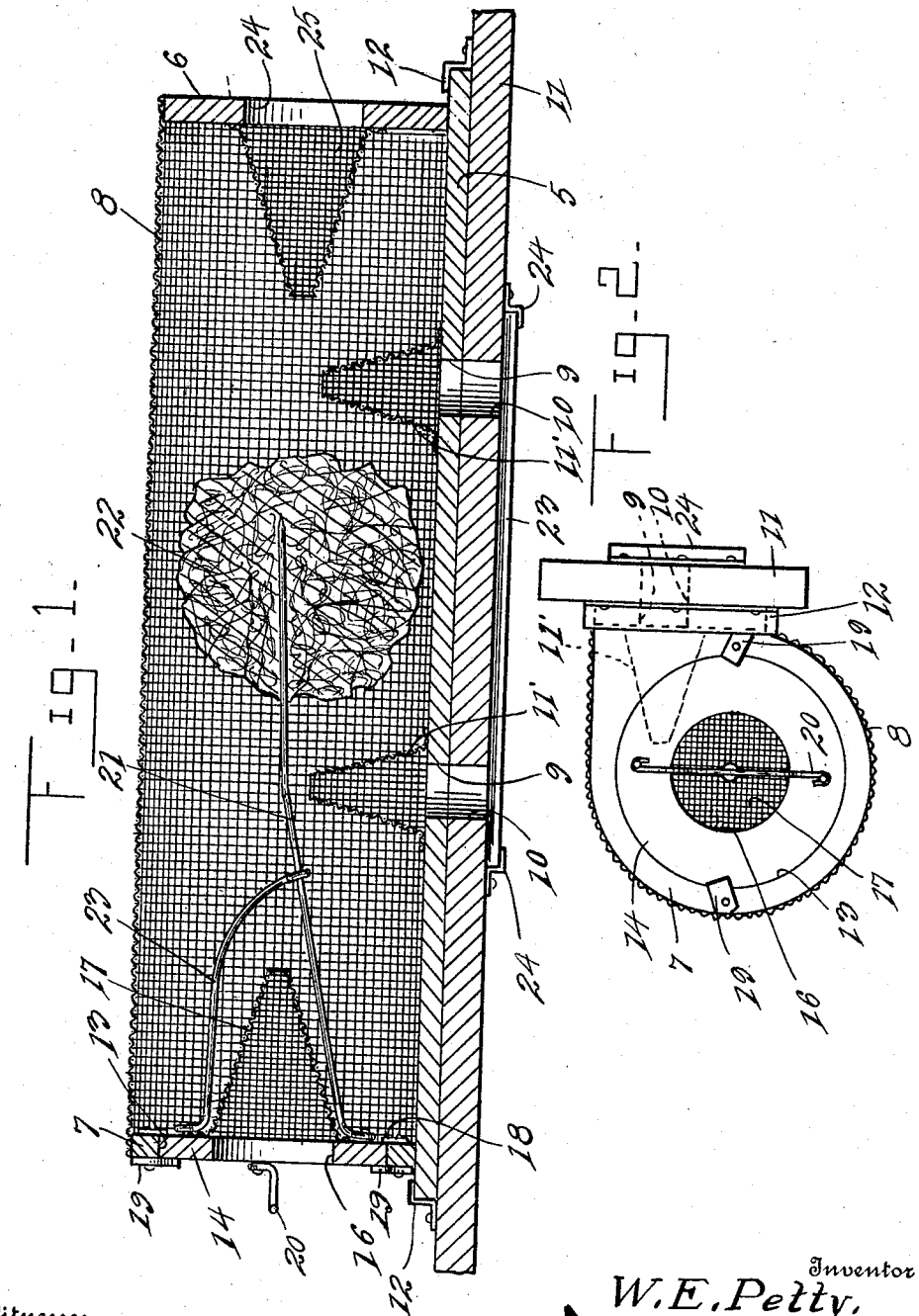
W. E. PETTY.
FLY TRAP FOR SCREEN DOORS.
APPLICATION FILED JUNE 20, 1913.
1,271,214.
Patented July 2, 1918.
Witnesses
C. R. Bealle.
R. M. Smith
Inventor
W. E. Petty.
Attorney

WILLIAM E. PETTY, OF PIPESTONE, MINNESOTA.

FLY-TRAP FOR SCREEN-DOORS.

1,271,214.

Specification of Letters Patent. Patented July 2, 1918.

Application filed June 20, 1913. Serial No. 774,921.

*To all whom it may concern:*

Be it known that I, WILLIAM E. PETTY, a citizen of the United States, residing at Pipestone, in the county of Pipestone and State of Minnesota, have invented certain new and useful Improvements in Fly-Traps for Screen-Doors; and I do hereby declare the following to be a full, clear, and exact description of the invention, such as will enable others skilled in the art to which it appertains to make and use the same.

This invention comprehends improvements in fly traps for screen doors and the like, and relates more particularly to those which are adapted to be supported upon the inside of a screen door adjacent its upper edge so as to catch flies endeavoring to enter above the door.

One of the objects of the invention resides in the provision of a fly trap of this nature which shall be of extremely simple construction, very easy to clean, and which will catch and detain flies as they enter through openings in the door, and which will also catch flies that are already within a dwelling.

As a further object, the invention contemplates the provision of a fly trap having a base formed with openings adapted to register with openings in a screen door, a body provided with a removable door at one end formed with an entrance opening surrounded by a frusto-conical screen, and a sponge holding element carried by the door.

With these and other objects in view, as will become more apparent as the description proceeds, the invention consists of certain novel features of construction, combination, and arrangement of parts, as will be hereinafter described and claimed.

For a complete understanding of my invention, reference is to be had to the following description and accompanying drawings, in which, Figure 1 is a horizontal section through the trap and a portion of a screen door, and, Fig. 2 is an end elevation of the trap and supporting element.

In the preferred embodiment of my invention, I provide a base member 5 which is preferably formed of a longitudinal strip of wood, and end pieces 6 and 7 which are secured to the base adjacent the ends thereof. A wire netting 8 is secured to the longitudinal edges of the base and to the end pieces 6 and 7 forming the body of the trap. The base is formed with a pair of entrance openings 9 which register with similar openings 10 extending through the top bar 11 of a door. Frusto-conical trap screens 11', surround the inner ends of the openings 9 and project into the body of the trap.

To support the trap upon the screen door so that the openings 9 will register with the openings 10, I provide the angular brackets 12 which extend transversely of the bar 11 and which receive the ends of the base 5.

The end piece 7 has its central portion cut away to provide a relatively large circular opening 13 in which is removably positioned a door 14 formed with an entrance opening 16. The frusto-conical trap screen 17 projects inwardly from around the opening and prevents the escape of flies therethrough. Stop members 18 are secured to the inner side of the end piece 7 to prevent the door moving too far inwardly, and pivoted latches 19 secured to the exterior side of the end piece 7 hold the door in proper position. The door is provided with a handle 20 by means of which it may be pulled from and inserted into the opening 13.

The door has attached to its inner side a sponge holding rod 21 which extends inwardly to a position intermediate the trap screens 11' and which is adapted to support a bait sponge 22 which is moistened by a sweetened liquid. A brace arm 23 is employed for the purpose of bracing and supporting the rod 21 and is secured rigidly at one end to the door 14 and is looped at its other end about the member 21, as clearly shown in Fig. 1. The rod 21 is secured to the door 14 at one side of the trap screen 17, and the brace arm 23 is secured to door at the opposite side of the trap screen. The manner in which the trap screen, rod and brace arm are secured to the door presents a compact and convenient arrangement of parts, and to permit of the parts being thus assembled the rod is of angular formation and the brace arm has its inner end curved in the direction of the rod and attached thereto at a point beyond the trap screen.

The end 6 is formed with a central entrance opening 24 surrounded by a frusto-conical trap screen 25. When the trap is in use, flies entering through the openings 9 and 10 will be directed by the screens 11' into the body of the trap. The entrance openings 16 and 24 will permit the flies already within the house to find their way into the trap, being directed therewithin by the sweetened liquid with which the sponge 22 is saturated. When it is desired to empty the trap it is slipped from the brackets 12 and the door 14 removed so that the flies may be dumped from the body of the trap. To prevent flies entering these openings, as when the trap is removed, I provide a board 23 which is held in place over the openings 10 by the brackets 24.

From the foregoing description taken in connection with the accompanying drawings, it will be apparent that I have provided an extremely simple, practical, and efficient fly trap which may be very cheaply constructed, easily cleaned, and quickly assembled. It is to be understood that while I have shown and described the preferred embodiment of my invention, I do not wish to be limited to this exact construction, combination, and arrangement of parts, but may make such changes as will fall within the spirit and scope of the invention as defined by the appended claims.

Having thus described my invention, I claim:—

1. A fly trap comprising an elongated body, a door removably positioned in one end of the body and provided with a fly entrance opening, a conical trap screen secured to the inner side of the door about the opening therein, an angular rod having one end secured to the inner side of the door at one side of the trap screen and extending inwardly beyond the trap screen, a brace arm secured at one end to the inner side of the door at the opposite side of the trap screen and extending inwardly beyond the trap screen and having its other end curved in the direction of the rod and attached to the rod at a point beyond the trap screen, and a sponge carried by the free end of the rod.

2. A fly trap comprising an elongated body, a door removably positioned in one end of the body, an angular rod secured at one end to the inner side of the door near one edge thereof, a brace arm secured at one end to the inner side of the door near the opposite edge thereof and having its other end curved in the direction of the rod and attached to the rod at a point in spaced relation to the door, and a sponge carried by the free end of the rod.

In testimony whereof I affix my signature in presence of two witnesses.

WILLIAM E. PETTY.

Witnesses:
G. H. GURLEY,
M. S. CRAIG.

Copies of this patent may be obtained for five cents each, by addressing the "Commissioner of Patents, Washington, D. C."